United States Patent [19]
Soodalter

[11] 3,990,336
[45] Nov. 9, 1976

[54] MEAT CUBING MACHINE

[76] Inventor: Arnold Soodalter, University Park Apts., Apt. M-1, Easthampton Road, Holyoke, Mass. 01040

[22] Filed: Aug. 6, 1975

[21] Appl. No.: 602,269

[52] U.S. Cl. .............................. 83/404.2; 83/408; 83/425.3
[51] Int. Cl.² ......................................... B26D 3/18
[58] Field of Search............... 83/404.2, 408, 425.1, 83/425.3

[56] References Cited
UNITED STATES PATENTS

| | | | |
|---|---|---|---|
| 1,357,829 | 11/1920 | Anstice | 83/404.2 |
| 1,726,356 | 8/1929 | Linde | 83/408 X |
| 2,161,891 | 6/1939 | Spang | 83/404.2 |
| 3,841,186 | 10/1974 | Demerin | 83/404.2 |
| 3,927,592 | 12/1975 | Nienstedt | 83/404.2 |

*Primary Examiner*—Willie G. Abercrombie
*Attorney, Agent, or Firm*—Ross, Ross & Flavin

[57] ABSTRACT

Apparatus for cubing meat comprising first cutting means for cutting a slab from a piece of meat, second cutting means for cutting the so severed slab into elongated strips, and third cutting means for cutting the so cut strips transversely into cubes.

3 Claims, 12 Drawing Figures

MEAT CUBING MACHINE

A primary object of the invention is to provide a simple, economical and efficient machine for quickly and easily cubing meat which is either in a fresh or frozen state.

This object is obtained by use of a reciprocating knife or rotating bandsaw blade to slab the meat, a first set of rotating knives to cut the slab into strips, and a second set of rotating knives to cut the strips into cubes.

Figure 1:
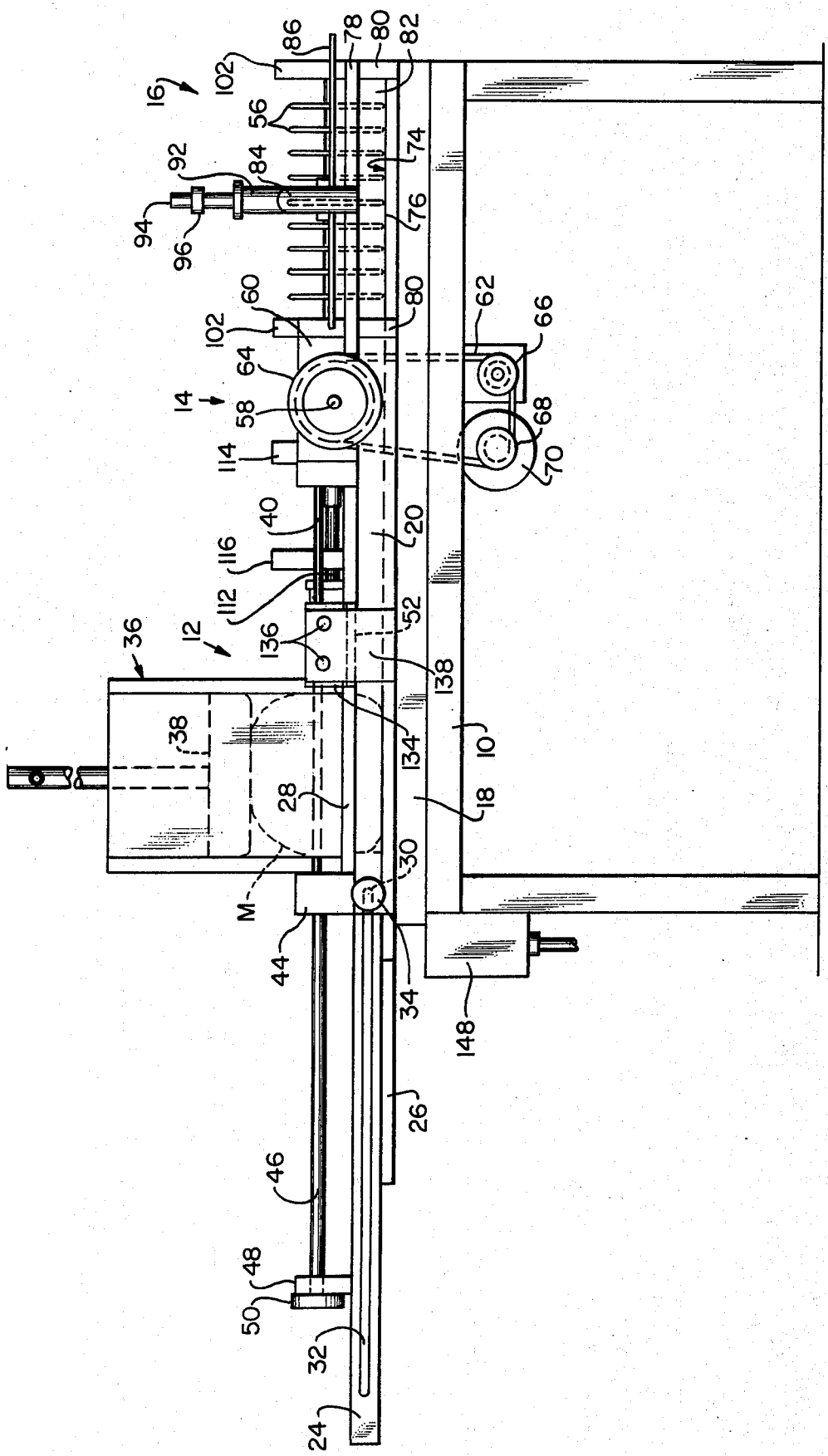
FIG. 1 is a front elevational view of a meat cubing machine embodying the invention.

The apparatus is supported by a table 10 and includes primary, secondary and tertiary cutting means 12, 14 and 16 respectively.

A base member 18 rests on table 10 and has a first pair of spaced, parallel and upstanding, guide members 20, 20 extending upwardly therefrom, the guide members defining a first meat channel 22 therebetween.

A first meat ram 24 is disposed in first meat channel 22 between guide members 20, being mounted for horizontal sliding movement between a channel lower wall 26 which is fixed to and rests on base member 18, and a channel upper wall 28 which is fixed to and rests on guide members 20.

Limit fingers 30 extend inwardly from each guide member and ride in slots 32 in the side walls of first meat ram 24, the fingers being fixed to adjusting handles 34 for rotation relative to the guide members, and defining, with the slots 32, the inner and outer limits of the stroke of the meat ram.

A meat hopper 36 is mounted for horizontal sliding movement relative to the upper face of channel upper wall 28 and is open at its upper and lower ends.

A cover 38 is slidably disposed in the hopper and rests on meat M disposed therein, the meat in turn resting on channel lower wall 26.

The meat hopper is slidable relative to a pair of spaced, horizontally-extending guide rods 40, 40 disposed upwardly of guide members 20, each guide rod extending through the hopper and being fixed at its opposite ends to forward and rearward abutment blocks 42 and 44 respectively fixed to the guide members.

A horizontally-extending push rod 46 disposed upwardly of first meat ram 24 is fixed at its inner end to the rear wall of hopper 36 and, at its opposite end, passes freely through an upright bracket 48 on the first meat ram, the push rod having a limit collar 50 on its outer free end which acts as a stop on abutment with bracket 48.

Primary cutting means 12 includes a cutting blade 52 which extends transversely between the guide members 20 and has a cutting edge 54 which faces the meat hopper, the cutting blade being mounted for horizontal reciprocating movement relative to the upper surface of each guide member 20 by means to be described.

Cutting blade 52 is strategically disposed so as to slice a slab from the lower side of the meat M as hopper 36 and first meat ram 24 are moved forwardly, movement of the hopper and first meat ram being effected by exerting an inward pressure on the collar 50 and bracket 48.

Figure 4:
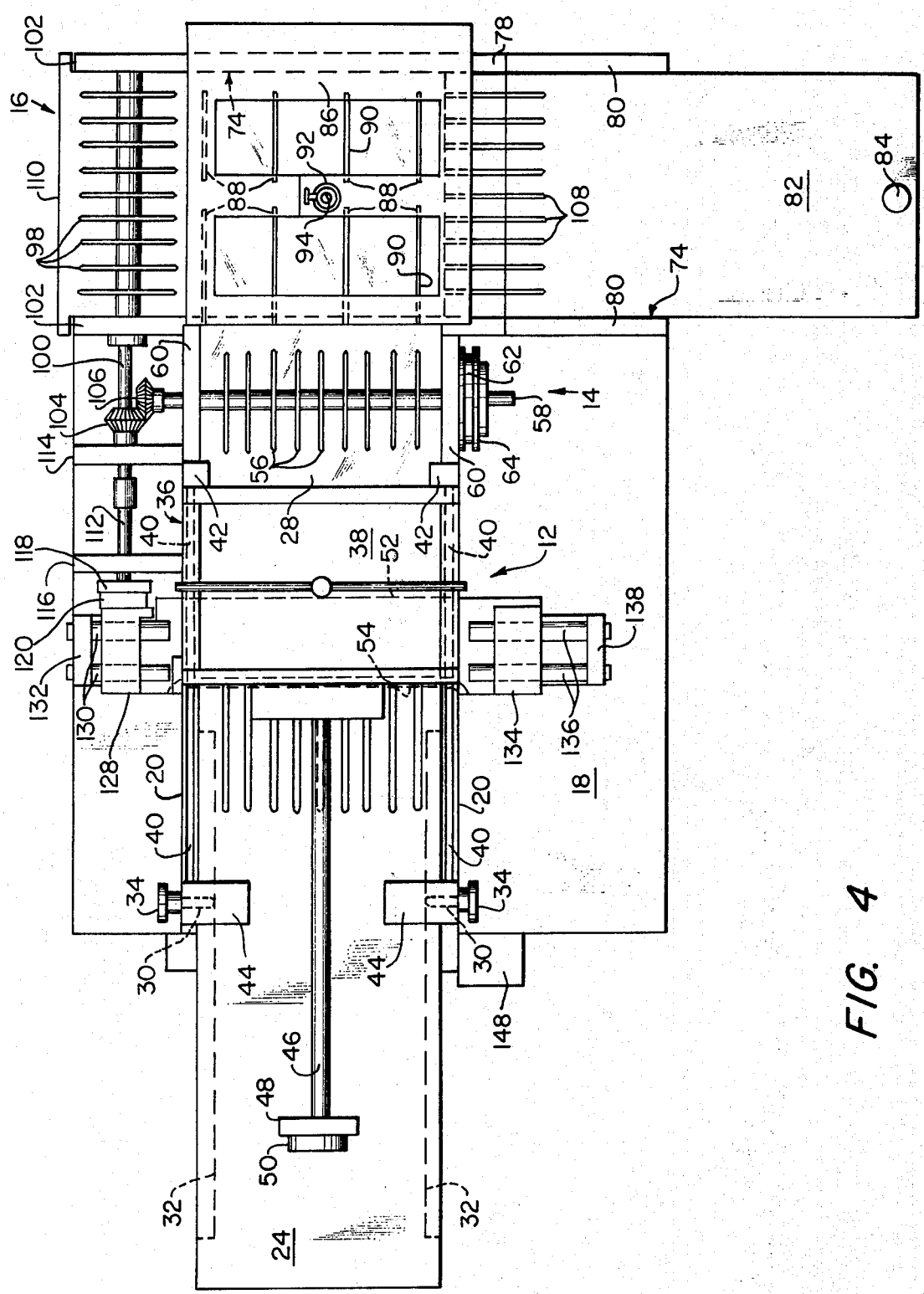
FIG. 4 is a view similar to FIG. 3 with the apparatus moved to a first meat-cutting position.

Continued inward pressure thereupon brings the hopper into contact with the forward abutment blocks 42, which preclude further forward movement of the hopper, the meat M now resting on the upper surface of channel upper wall 26, and the slab which was cut therefrom being disposed below the channel upper wall 28 within first meat channel 22, with the forward edge of first meat ram 24 abuting the rear edge of the slab. The apparatus is now in the position illustrated in FIG. 4.

The slab is disposed immediately rearwardly of and is ready for cutting by secondary cutting means 14, which comprises a plurality of spaced, annular, rotatable cutting knives 56 mounted on a shaft 58 which extends transversely between and is journalled in spaced end plates 60 extending upwardly from guide members 20.

Shaft 58 is rotated by a belt 62 which is entrained around a pulley 64 fixed to one end of the shaft, and idler pulley 66 on table 10, and a drive pulley 68 fixed to the drive shaft of a motor 70 also fixed to table 10.

Figure 5:
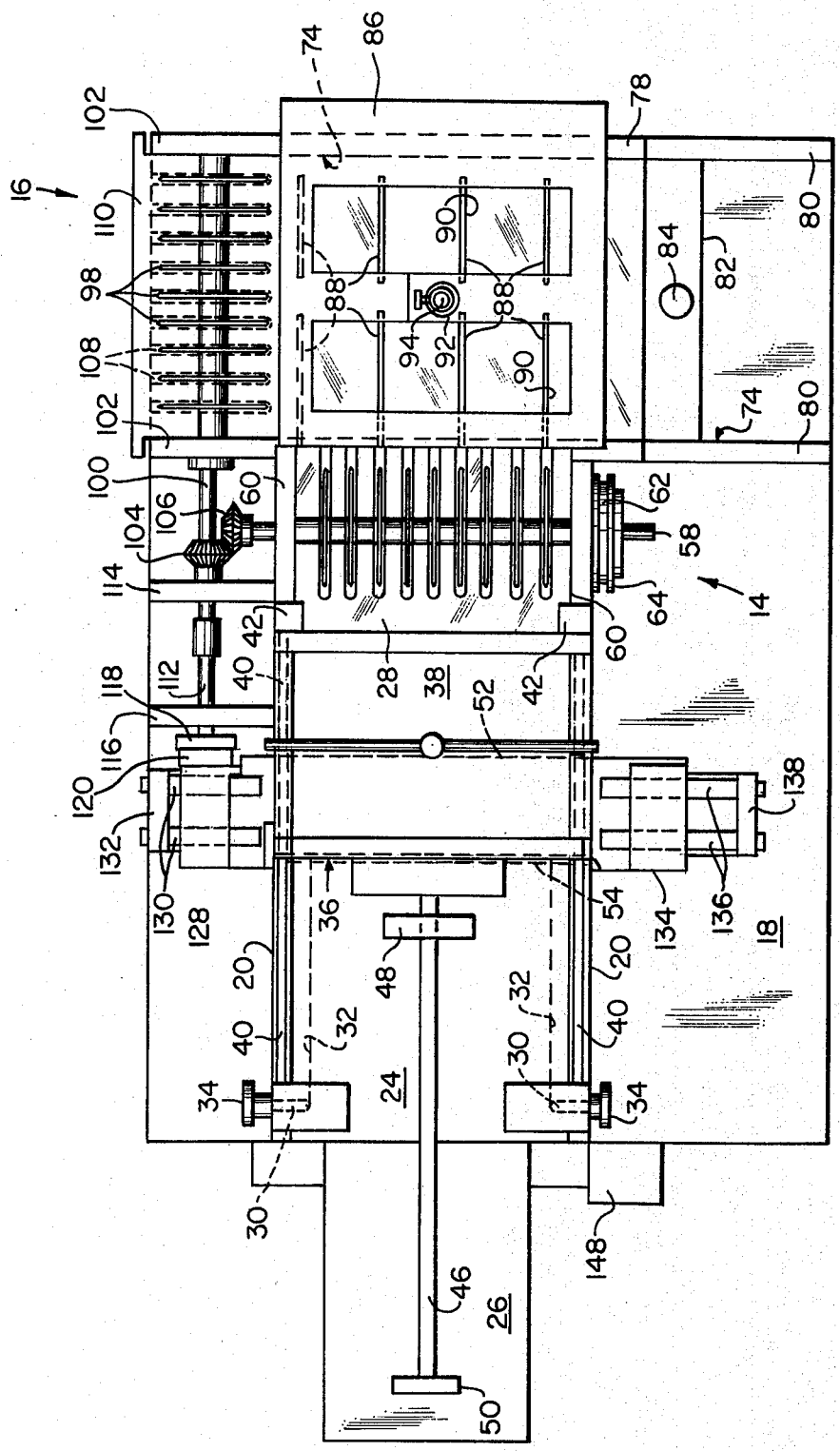
FIG. 5 is a view similar to FIG. 3 with the apparatus moved to second and third meat-cutting positions.
Figure 6:
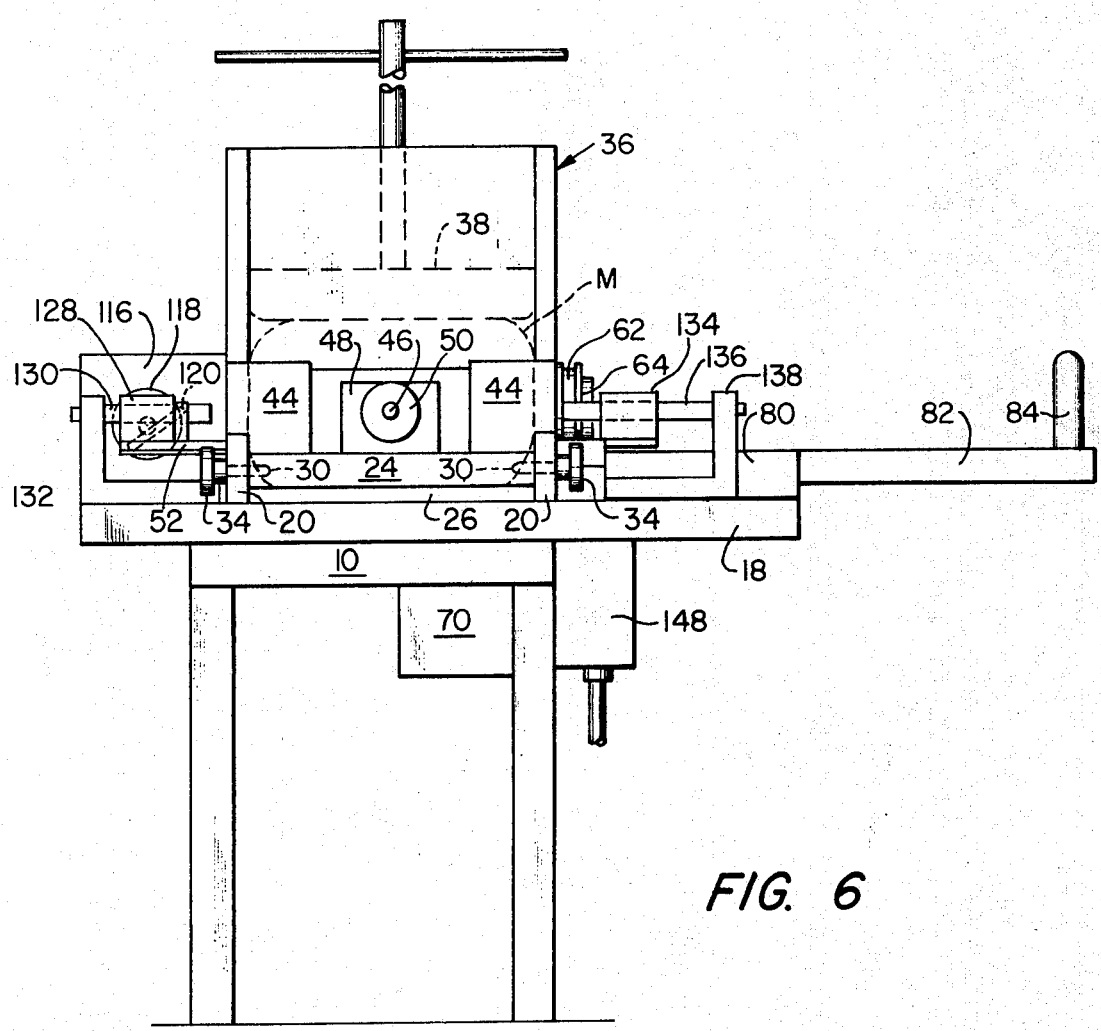
FIG. 6 is an end elevational view as seen from the left of FIG. 1.

First meat ram 24 may now be moved forwardly within first meat channel 22 to the position shown in FIG. 5, with bracket 48 sliding along and relative to push rod 46, the forward end of the meat ram being provided with a plurality of spaced slots 72, each slot being aligned with a cutting knife 56 for providing necessary clearance to permit passage of the forward edge of the first meat ram past the knives.

Such forward pressure on first meat ram 24 now forces the previously cut slab of meat into the paths of the rotating cutting knives 56, to cut the slab into a plurality of strips, and to force these strips into a second meat channel 74 provided immediately forwardly of secondary cutting means 14, the second meat channel being normal to, in communication with, and on a plane with first meat channel 22.

Second meat channel 74 includes a second channel lower wall 76 which is fixed to and rests on base member 18 on a plane with first channel lower wall 26, and a second channel upper wall 78 on a plane with first channel upper wall 28. Second channel upper wall 78 rests on a second pair of spaced, parallel and upstanding guide members 80, 80 extending upwardly from base 18, these guide members being disposed normal to first guide members 20.

A second meat ram 82 disposed in second meat channel 74 is adapted for sliding movement relative to the channel by force exerted on a handle 84 which extends upwardly from the second meat ram adjacent the free outer end thereof.

Immediately forwardly of secondary cutting means 14 and overlying second meat channel 74 is a movable strip guide plate 86, which includes a plurality of spaced partitions 88 which depend therefrom into the second meat channel for guiding the strips of meat and keeping them in alignment as they are pushed into the second meat channel by first meat ram 24, the partitions 88 being aligned with certain of the cutting knives 56 of the secondary cutting means and passing freely downwardly through slots 90 provided in second channel upper wall 78.

So long as strip guide plate 86 is in a lowered position, the partitions 88 are disposed within second meat channel 74, wherefore second meat ram 82 cannot be moved inwardly.

Means is provided for moving strip guide plate 86 upwardly to move the partitions 88 out of second meat channel 74 and includes an upright handle 92 which is fixed to the upper face of the strip guide plate and sleeves an upright slide post 94 which is fixed to the upper face of channel upper wall 78.

By grasping handle 92, the strip guide plate may be moved upwardly and downwardly relative to slide post 94, thereby moving partitions 88 out of and into second meat channel 74.

A stop collar 96 on the slide post defines the upper limit of movement of handle 92 and the strip guide plate.

Figure 9:
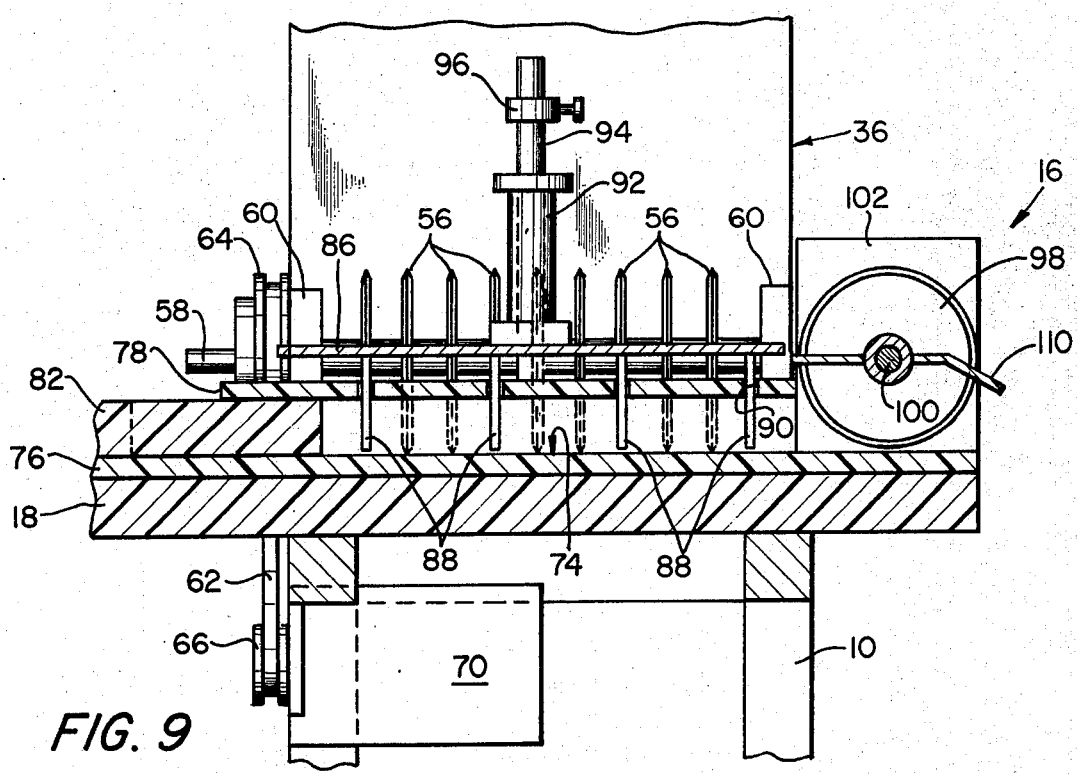
FIG. 9 is an enlarged cross-sectional view taken on line 9—9 of FIG. 3.

In FIG. 9, the partitions are shown in a lowered position wherein they are disposed in the second meat channel.

Figure 10:
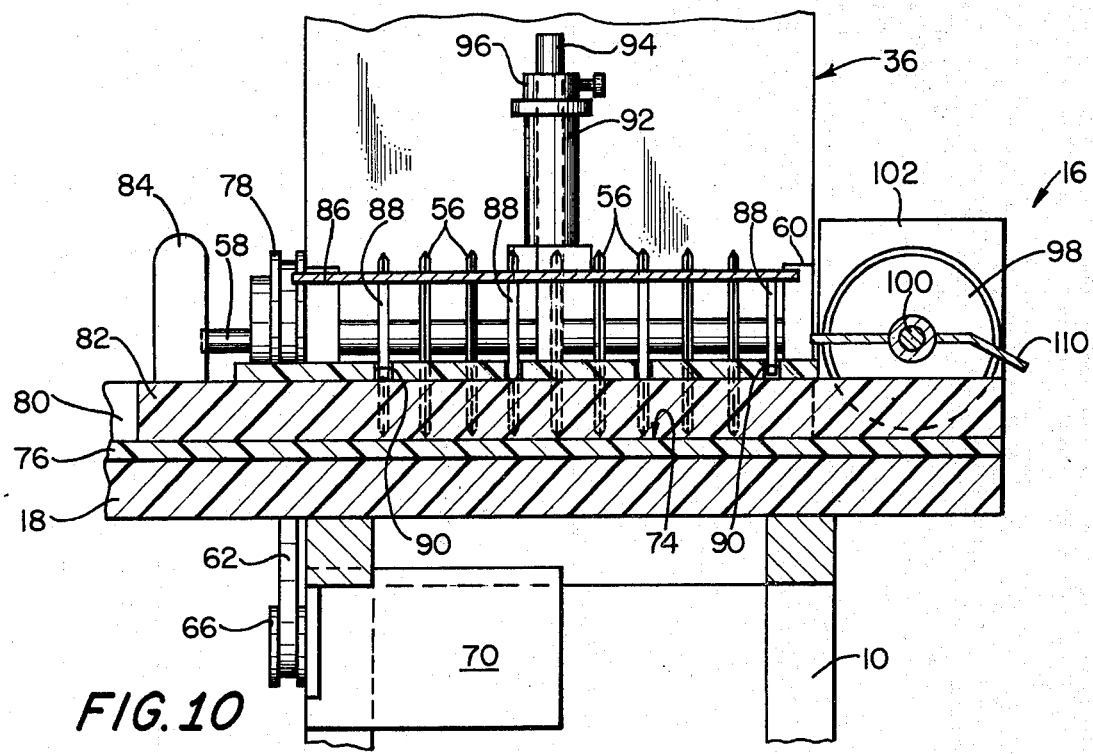
FIG. 10 is a view similar to FIG. 9, with the apparatus in third meat-cutting position.

In FIG. 10, the partitions are shown in a raised position, with their lower ends disposed above the plane of the lower face of channel upper wall 78, whereby second meat ram 82 may be moved into the second meat channel.

Tertiary cutting means 16 is disposed at the outboard end of second meat channel 74 and comprises a plurality of spaced, annular, rotatable cutting knives 98 mounted on a shaft 100 which extends transversely between and is journalled in spaced end plates 102 extending upwardly from guide members 80.

Shaft 100 extends outwardly from the innermost end plate 102 and has a first bevel gear 104 fixed thereto, which bevel gear meshes with a second bevel gear 106 fixed to an extension of shaft 58 of second cutting means 14, whereby rotation of shaft 58 by motor 70 sets up a concomitant rotation of shaft 100 and cutting knives 98 of tertiary cutting means 16.

The inboard end of second meat ram 82 is provided with a plurality of spaced slots 108, each slot being aligned with a cutting knife 98 for providing necessary clearance to permit passage of the inboard end of the second meat ram therepast.

Inward pressure on the second meat ram forces the previously cut strips of meat into the paths of the rotating cutting knives 98 to cut the strips into cubes.

A deflector 110 on the tertiary cutting means deflects the cubes of meat downwardly into a container or conveyor, not shown, for further processing as desired.

An extension 112 on shaft 100 of tertiary cutting means 16 is journalled in a pair of end plates 114 and 116 which extend upwardly from base 18 outwardly of one side of first meat channel 22. Rotation of shaft 100 through the meshing gears 104, 106 sets up a concomitant rotation of shaft extension 112.

Rotation of shaft extension 112 effects reciprocating movement of primary cutting means 12 by means now to be described.

Figure 7:
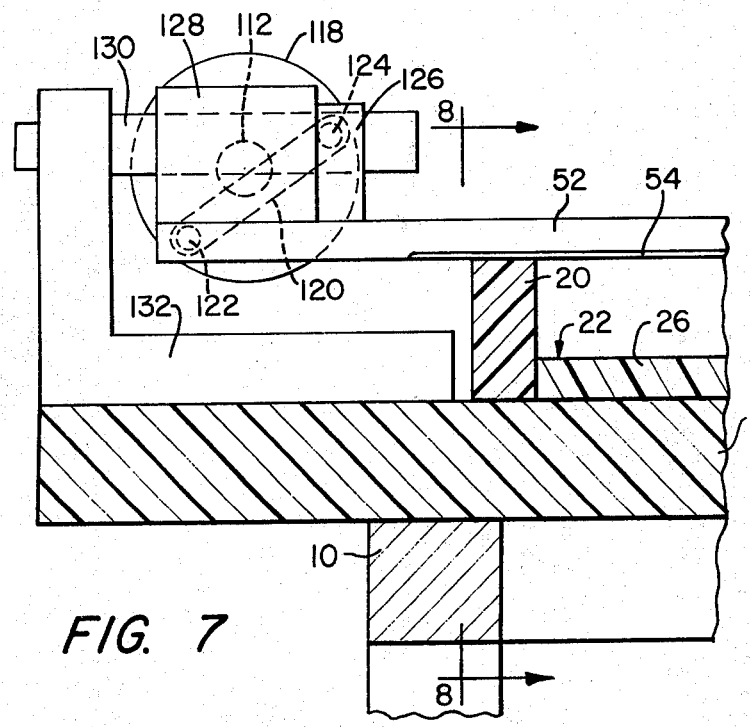
FIG. 7 is an enlarged cross-sectional view taken on line 7—7 of FIG. 3.
Figure 8:
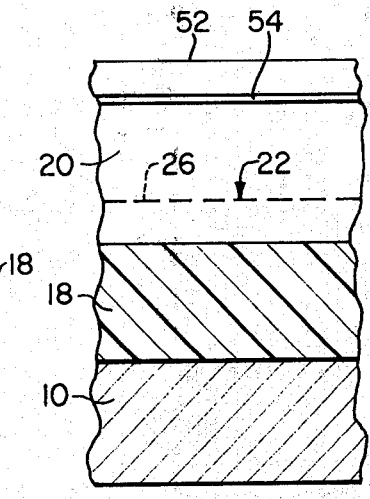
FIG. 8 is a cross-sectional view taken on line 8—8 of FIG. 7.

As best seen in FIG. 7, an eccentric 118 fixed to the infoard free end of shaft extension 112 has one end of an arm 120 pivoted thereto by a pivot pin 122.

The opposite or upper end of arm 120 iw pivoted by a pin 124 to an extension 126 of a block 128 fixed to the upper face of cutting blade 52.

A pair of spaced, parallel, horizontally-disposed slide rods 130, 130 pass freely through the block 128 and are fixed at their outer ends to an upstanding bracket 132 fixed to base member 18.

The opposite end of cutting blade 52 is similarly supported and is fixed to the lower face of a block 134 having a pair of spaced, parallel, horizontally-disposed slide rods 136, 136 passing freely therethrough, the slide rods being fixed at their outer ends to an upstanding bracket 138 fixed to base member 18.

It will be apparent that rotative movement of shaft extension 112 is translated to reciprocatory movement of cutting blade 52 by the eccentric 118 and arm 120, with blocks 128 and 134 sliding relative to the stationary slide rods 130 and 136.

Cutting knife 52 reciprocates relative to channel upper wall 28 of first meat channel 22.

Appropriate shields, not shown, will be provided for all of the cutting means.

Power to the apparatus is delivered through a junction box 148 mounted on table 10.

Figure 2:
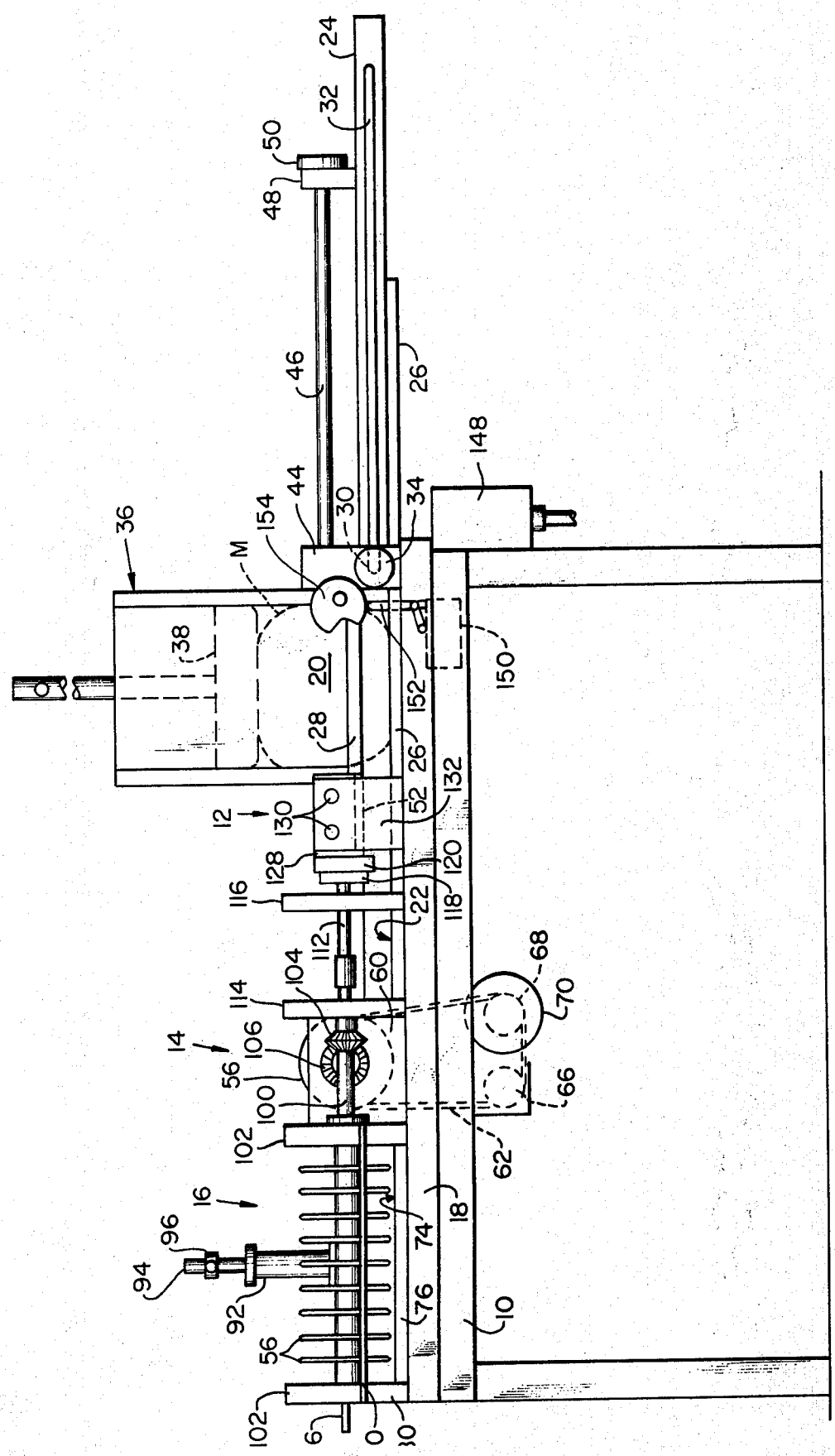
FIG. 2 is a rear elevational view thereof.
Figure 3:
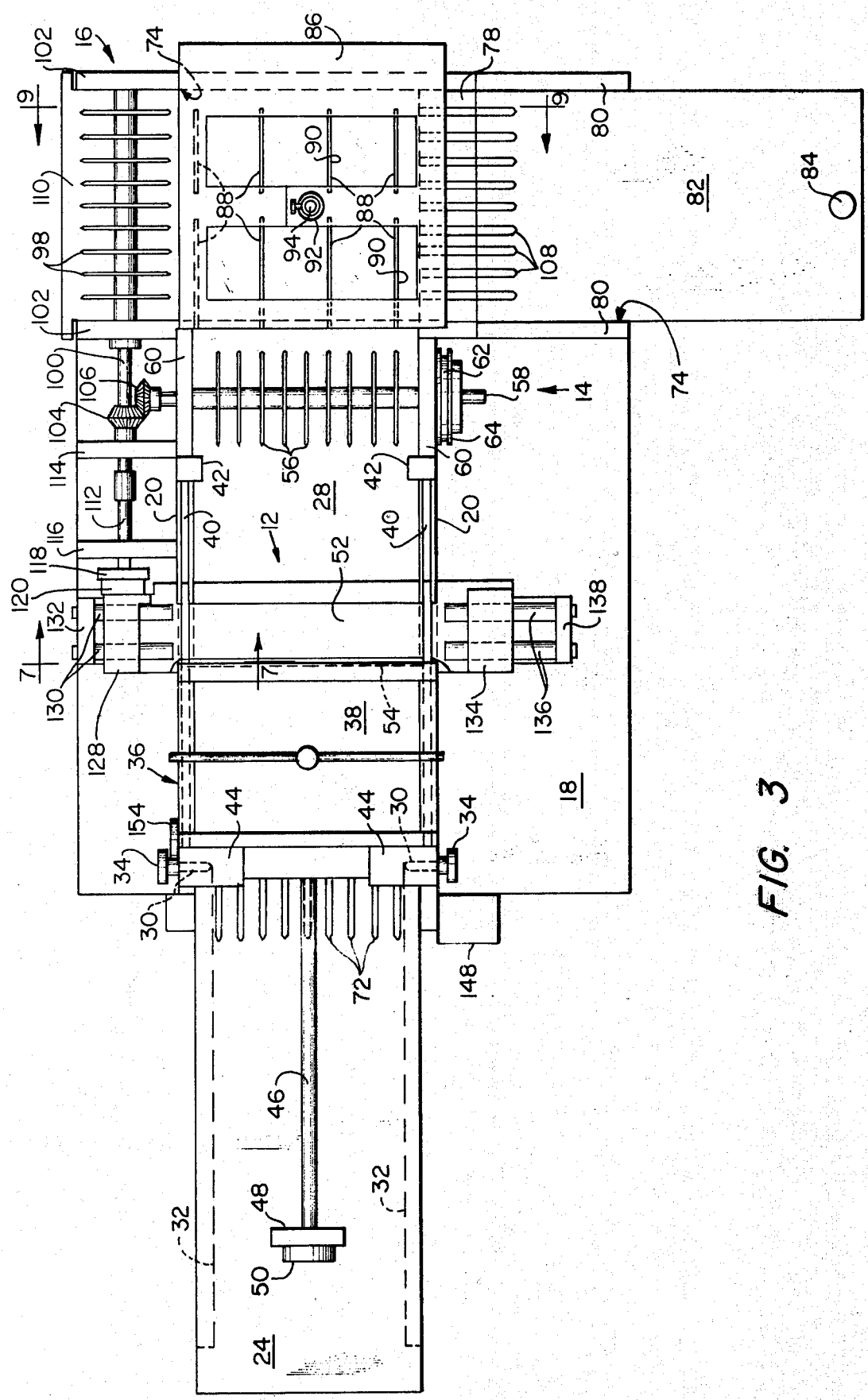
FIG. 3 is a top plan view thereof.

Actuation of the cutting knives is controlled by a switch 150, see FIG. 2, also mounted on the table and having an upright contact finger 152 which extends upwardly through base 18 and is so positioned as to be contacted by a cam 154 fixed to the rear wall of meat hopper 36.

When the cam 154 contacts the finger 152, the switch is opened whereby the motor 70 is deactivated to stop movement of the cuting means.

When the hopper is moved forwardly so that the cam clears the finger 152, the switch is closed to activate the motor and the cutting means.

The apparatus is preferably, but not necessarily, formed from thermoplastic material having easy to clean characteristics, and is adapted for complete disassembly for such easy cleaning.

Channel upper walls 28 and 78 are also preferably formed of a transparent thermoplastic material so that the meat in the first and second meat channels is visible.

While an eccentric type drive has been shown and described for reciprocating the primary cutting means, I do not desire to be limited thereto, since any other suitable type of drive may be employed.

Cutting blade 52 and cutting knives 56 and 98 may be replaced by sawteeth cutters when it is desired to process frozen meat.

Figure 11:
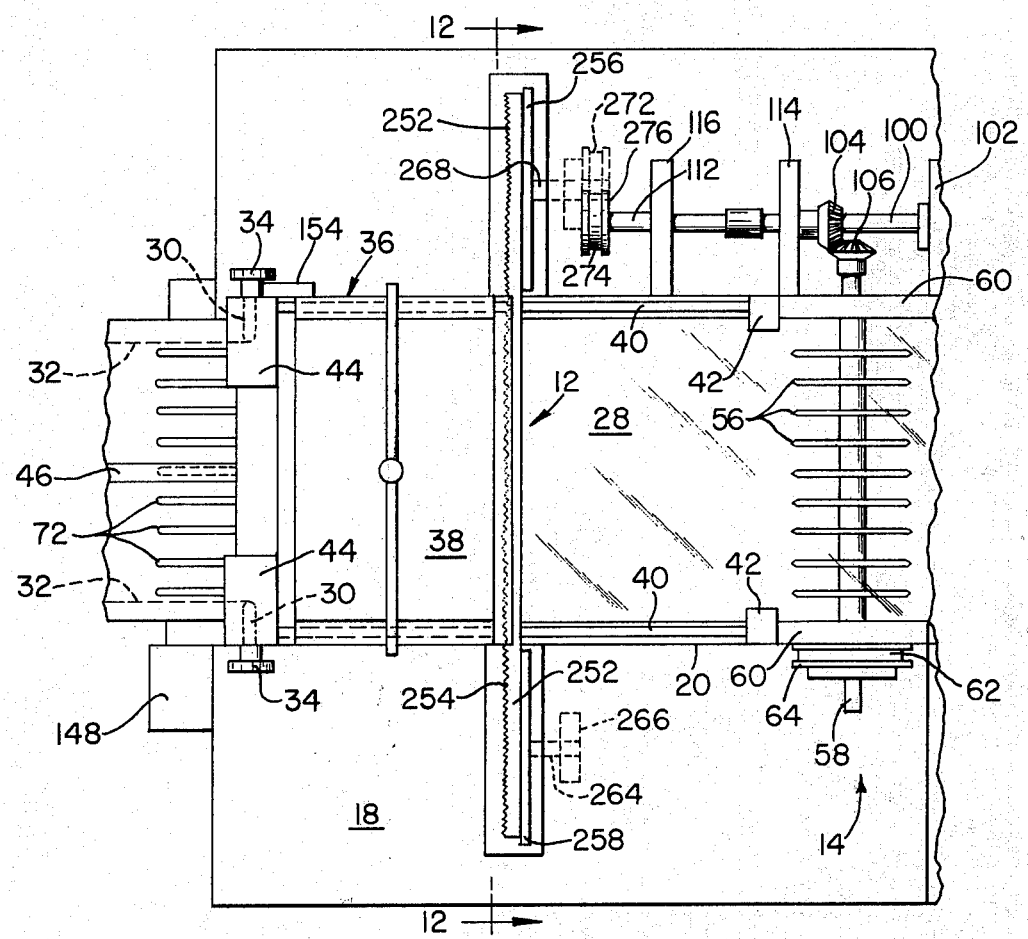
FIG. 11 is a fragmentary top plan view of a modified form of the invention.
Figure 12:
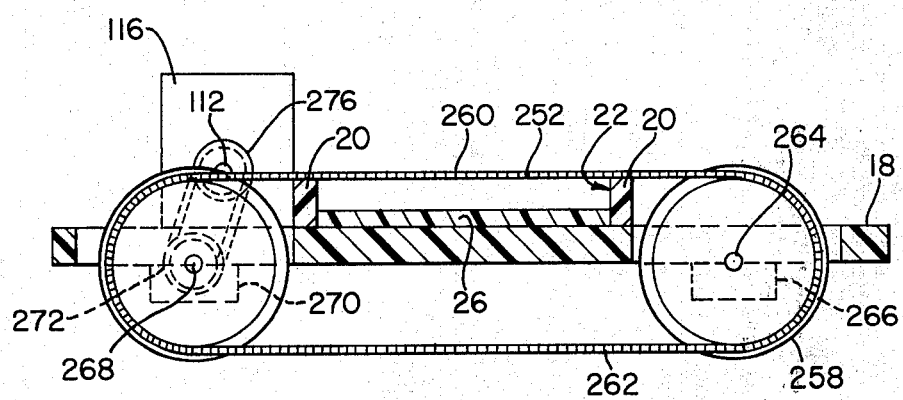
FIG. 12 is a cross-sectional view taken on line 12—12 of FIG. 11.

In the embodiment shown in FIGS. 11 and 12, cutting blade 52 of primary cutting means 12 has been replaced by a bandsaw blade 252, which may have a serrated or saw tooth cutting edge 254 as shown or a knife edge.

The bandsaw blade is entrained about a pair of spaced drums 256 and 258 each disposed outboard of one of the guide members 20, has an upper reach 260 which passes over the members 20 and a lower reach 262 which passes below base member 18.

Drum 258 is fixed to a shaft 264 journalled relative to a bracket 266 on base member 18 and drum 256 is fixed to a shaft 268 journalled relative to a bracket 270 on base member 18.

Shaft 268 has a pulley 272 fixed to its outer end, the pulley having a belt 274 passing therearound and around a pulley 276 fixed to the free end of shaft extension 112, whereby rotation of shaft extension 112 sets up a concurmitant rotation of drum 256 to rotate the bandsaw blade 252.

The apparatus has been designed with the safety of the operator in mind, since he must use both hands in its operation.

The apparatus quickly and efficiently performs the cubing function by: first, cutting a slab from the bottom of a piece of meat; second, cutting that slab into strips; and third, cutting those strips transversely into cubes.

I claim:

1. Apparatus for cubing meat comprising, first cutting means for cutting a slab from a piece of meat, second cutting means for cutting the slab longitudinally into strips, and third cutting means for cutting the strips transversely into cubes, wherein the first cutting means is a horizontally reciprocable cutting blade, and wherein the second and third cutting means each comprise a plurality of upright annular rotatable cutting blades, the first and second cutting means being disposed in a horizontally-disposed first meat channel, and the third cutting means being disposed in a horizontally-disposed second meat channel normal to the first meat channel, a first meat ram slidable in the first meat channel, a second meat ram slidable in the second meat channel, a meat hopper linked to and slidable with the first meat ram, and a strip guide having a plurality of partitions in the second meat channel for guiding strips of meat, and handle means for effecting vertical movement of the strip guide for clearing the partiions from the second meat channel, whereby manual inward sliding movement of the first meat ram first causes a slab to be cut from meat within the hopper by the first cutting means, second causes the so-cut slab to be sliced into strips by the second cutting means and third causes the so-sliced strips to be moved into the second meat channel between the partitions of the strip guide for retaining the strips in alignment, with manual vertical upward movement of the strip guide moving the partitions out of the second meat channel whereby manual inward sliding movement of the second meat ram causes the aligned strips to be moved to the third cutting means for cubing.

2. Apparatus according to claim 1, wherein the cutting blades are serrated.

3. Apparatus according to claim 1, wherein the first cutting means is a horizontally rotatable bandsaw blade.

* * * * *